INVENTOR.
GEORGE C. YEHLING, JR.

Sept. 11, 1962 G. C. YEHLING, JR 3,053,829
CONTINUOUS DISTRIBUTION OF ALKALI CELLULOSE
Filed Nov. 20, 1957 2 Sheets-Sheet 2
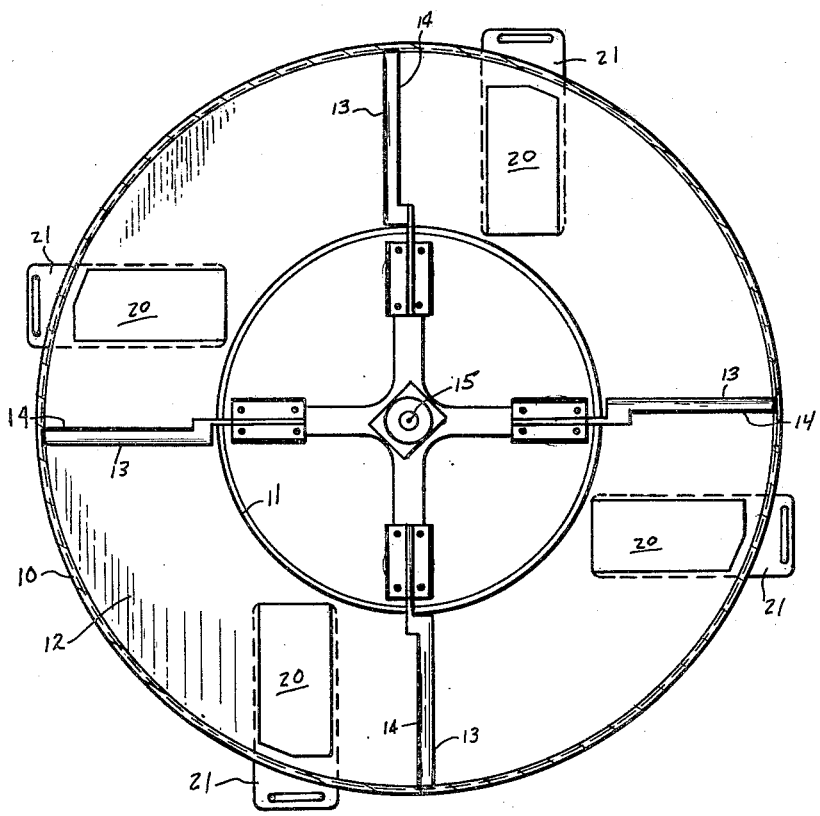
FIG - 2
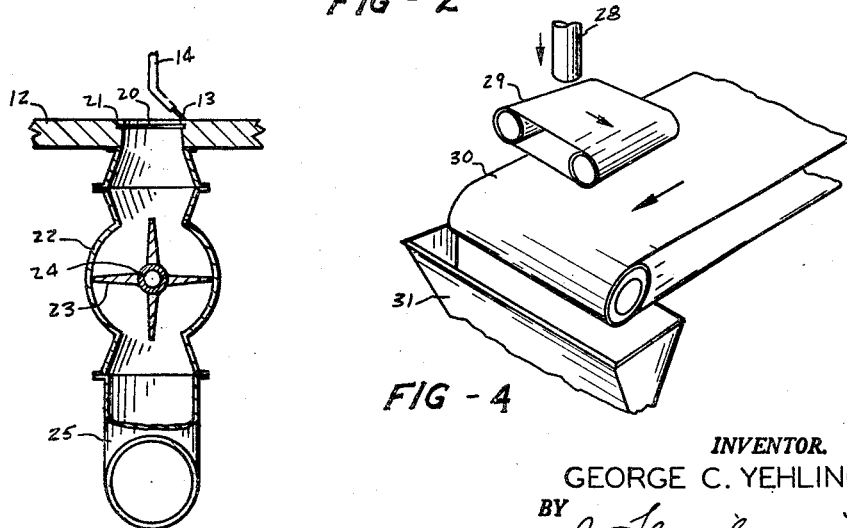
FIG - 3
FIG - 4
INVENTOR.
GEORGE C. YEHLING, JR.
BY

3,053,829
CONTINUOUS DISTRIBUTION OF ALKALI CELLULOSE

George C. Yehling, Jr., Danville, Ill., assignor to Olin Mathieson Chemical Corporation, a corporation of Virginia
Filed Nov. 20, 1957, Ser. No. 697,633
8 Claims. (Cl. 260—233)

This invention relates to an improved process and means for the continuous distribution of alkali cellulose, adapted to provide readily controllable and uninterrupted operations in the continuous production of a cellulose derivative, such as viscose, of high quality.

Alkali cellulose is an important intermediate in the production of various cellulose derivatives such as ethyl cellulose, methyl cellulose, cellulose acetate, hydroxyethyl cellulose, and carboxymethyl cellulose, and particularly, of cellulose xanthate, which is dispersed in dilute caustic soda solution to form viscose which may be converted to regenerated cellulose fibers, filaments, or film.

Alkali cellulose is formed by soaking cellulose fibers in strong aqueous caustic soda solution, for example about 18% NaOH by weight, removing excess solution, and subjecting the fibrous alkali cellulose to the action of a mechanical shredder. The resulting fibrous particles, generally referred to as "A.C. crumbs," are then generally subjected to an aging treatment which is effected at a controlled temperature for the required period of time in the presence of an atmosphere containing oxygen. The aging treatment is generally accepted as one which effects oxidation and depolymerization. A proper and uniform aging treatment is essential for the production of aged alkali cellulose which is reactive to yield uniformly the desired quality of cellulose derivative in subsequent operations.

Continuous processes for the aging of alkali cellulose have been described, for example in U.S. Patent 2,490,097, wherein alkali cellulose is continuously aged by the passage thereof as a column through a tower.

However, adequate provisions have not heretofore been proposed for the distribution in optimum physical state of the fibrous particles of aged alkali cellulose to a plurality of stations where the following treatment toward the formation of the desired cellulose derivative is effected nor for the proper correlation of the rates of discharge nor for flexibility of operation. The accomplishment of the above has been the main objective of this invention. The objects also include the provision of an improved process and means for controlling the rate of discharge of alkali cellulose in desired physical form from the bottom layer of a continuously advancing column thereof and then conveying a plurality of streams of the alkali cellulose to the following treatment at rates controlled in accordance with the requirements of the treatment for the material. A further object is the provision of an improved readily controllable and highly flexible process and apparatus for distributing aged alkali cellulose from the bottom layer of a column thereof to provide material continuously, in desired physical form and at the proper rate, to any one or more of a plurality of subsequent treating stations.

The above and other objects have been successfully accomplished by this invention and particularly by arranging for the discharge of particles of alkali cellulose from the bottom layer of a column into a distribution chamber, the rate of discharge being so controlled as to maintain a substantially constant depth of the alkali cellulose in the chamber. A plurality of outlets have been symmetrically arranged in the base of the chamber, each leading to a station for effecting the subsequent treatment, any one or more of such outlets being usable as and when desired. Furthermore, each such outlet is furnished with positive discharge means controlled to supply material at the proper rate in accordance with the requirement of the following treatment.

The features are described in detail below in connection with a specific embodiment illustrating the invention, as shown in the accompanying drawings, in which:

FIGURE 2 is a horizontal section taken on the line 2—2 of FIGURE 1 showing the four scraper arms and outlet ports;

FIGURE 3 is a vertical section taken on the line 3—3 of FIGURE 1 showing one of the outlets and its rotary air lock discharge means; and FIGURE 4 is a perspective view showing diagrammatically a weigh belt and conveyor assembly receiving the material discharged from one of the outlets.

Figure 1:
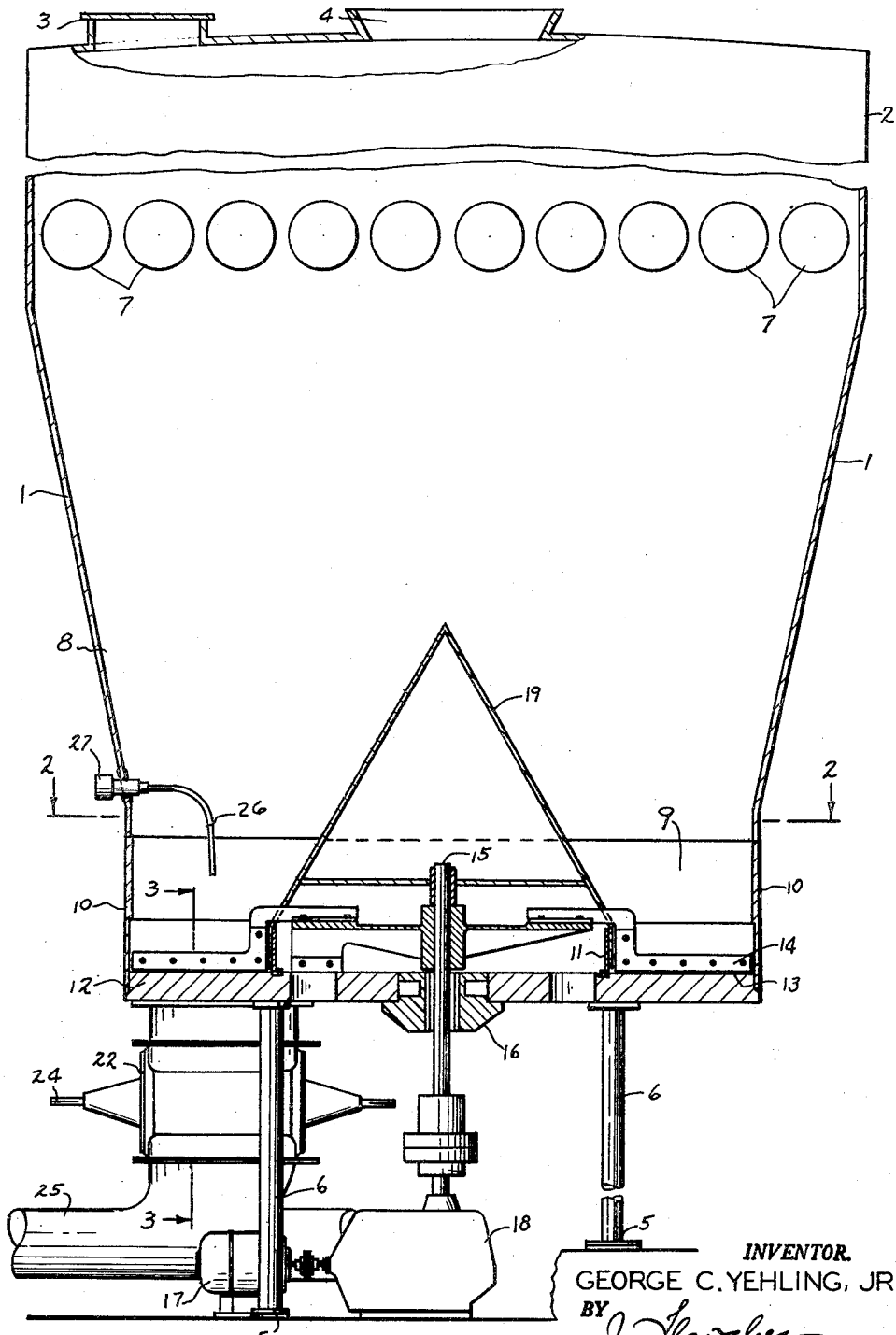
FIGURE 1 is a vertical section through the base portion of an aging tower showing the distribution chamber, outlets, and associated parts.

The continuous alkali cellulose aging tower illustrated in FIGURE 1 comprises a vertical vessel 1 which may have a circular, elliptical or rectangular cross section. The tower shown is forty feet high and is rectangular in cross section, eleven feet by thirteen feet, and is preferably of welded steel construction, provided with filleted or rounded internal corners so that the interior walls are smooth and free of pockets in order to prevent the lodging and hold-up of material. The vertical tower walls 2 may, if desired, be provided with a heat-exchange jacket or heating and cooling coils, and are preferably covered with heat-insulating material, not shown, consisting for example of 85% magnesia block three inches in thickness coated with a layer of protective mastic. The top of the tower is furnished with a manhole cover 3, for providing access to the interior, and inlet connection 4, through which "A.C. crumbs" are continuously fed into the tower.

The alkali cellulose particles are produced in earlier mercerizing, pressing and shredding operations, preferably effected in continuous manner by methods and apparatus known in the art. For example, alkali cellulose may be produced as described in U.S. 2,452,542 and then passed through a continuous shredder.

The particles are charged continuously at a substantially constant rate so as to maintain a column of constant height in the tower, thus maintaining a constant period for aging the alkali cellulose. Any appreciable variation from the desired aging period would be reflected in a change in the height and therefore the weight of the alkali cellulose column. Such weight is readily determined by means of load cells 5 in the base of each of four posts 6 supporting the tower. If any significant variation occurs, the desired weight and height of column may be restored by appropriate modification of the rate at which the cellulose is fed to the initial mercerizing step of the process.

In order to isolate the atmosphere within the tower 1, the alkali cellulose is fed into inlet 4 through a rotary air lock or equivalent device. On entry into the tower, the material is evenly spread over the top of the column of alkali cellulose, as by means of a conical baffle centrally placed below the inlet, supplemented if desired by one or more concentric frustro-conical surfaces. Each layer of alkali cellulose passes continuously down the tower so as to arrive at the discharge area in properly aged state.

Uniform discharge from the bottom layer of the column is accomplished by a set of parallel rolls 7, which may be eleven feet long and ten inches in diameter, spaced eleven and eight-tenths inches between centers. The surface of each roll is desirably provided with spaced protuberances, a particularly effective combination being secured by cleats parallel to the longitudinal axis of the roll, protruding about a quarter of an inch from the roll surface and spaced 18° apart. Further advantage has been secured by the provision of cleats with projecting teeth, such cleats being spaced 90° apart and of such length and arrangement as to clear the cleats of the adjacent rolls, while permitting the alkali cellulose to bridge the gaps except when the rolls are rotated. Other forms of discharge rolls may be employed effectively, as disclosed in U.S. 2,490,097. Also, the rolls 7 may be driven as shown and described in the said patent, so that adjacent rolls rotate in opposite directions. A serviceable drive may likewise consist of a piston-actuated shaft connected through suitable gearing to the set of clockwise-rotating rolls and another to the set of counterclockwise-rotating rolls, so arranged and operated that one set is stationary while the other is rotated.

The bottom layer of the column of alkali cellulose is continuously discharged by the operation of the rolls 7, as above described, and at a rate in accordance with the rate of rotation of the rolls, which is controlled as described hereinafter. A further essential function accomplished by the operation of the rolls is to open the alkali cellulose from a dense form resulting from the compression to which it is subjected in the column to a form, displaying low apparent density, which is readily penetrated by and reactive with liquid reagents. For example, while alkali cellulose in the column may have an apparent density as high as thirty-one pounds per cubic foot, the material discharged from the rolls displays an apparent density of seven to eight pounds per cubic foot and readily absorbs and reacts with carbon disulfide or other liquid reagents.

The fibrous particles of alkali cellulose removed from the bottom layer of the aging column by the operation of rolls 7 drop through the conically-shaped lower portion 8 of the tower 1 to the annular distribution chamber 9. Distribution chamber 9 comprises outer cylindrical wall 10, inner cylindrical wall 11, and base 12, which is also the base of the tower and is supported on the four posts 6.

The base 12 of the annular distribution chamber 9 is is continuously swept by four symmetrically placed scraper blades 13 mounted, at an angle of about 45°, to arms 14 which are secured to shaft 15, which as shown in the drawings rotates counterclockwise. Shaft 15 is mounted in bearing assembly 16 and is rotated at the desired constant speed by motor 17 through reducer 18. Also mounted on shaft 15 and rotating therewith is a conical sheet metal guide 19, which insures the uniform spreading of alkali cellulose particles into chamber 9.

The discharge of particles from the chamber 9 occurs through four or more outlet ports 20, symmetrically placed in base 12, and each provided with a slide gate valve 21. Each outlet further comprises a rotary air lock 22, provided with four or more vanes 23 attached to a motor-driven shaft 24, the rate of rotation being controlled as described hereinafter. The fibrous particles of alkali cellulose discharged by the rotary air lock drop into conduit 25 of a pneumatic conveyor which transfers the material to the following treatment in the process.

An essential feature required for the successful operation of the distribution method and apparatus of this invention is the maintenance of a constant depth of material within the annular chamber 9. Preferably, the level in chamber 9 is maintained in a plane substantially above the top surface of arms 14 by the appropriate control of the rate at which rolls 7 are rotated. Conveniently, the rate of rotation is set at a minimum value, for example, four revolutions per hour, corresponding to a smaller material discharge rate than is required in subsequent operations. A suitable sensing element is so positioned in chamber 9 as to speed rolls 7 whenever the top layer of the alkali cellulose falls below the desired plane and to return the rotation of the rolls to the lower base speed when the need for additional material has been supplied. A float control assembly actuating electric relays controlling the roll operating mechanism may be used as the sensing element. Preferably, the sensing element consists of an electronic level control probe or electrode 26 of known type, adapted to sense any appreciable change in electrical capacity of its surroundings when connected with a suitably housed control unit 27 containing a proper relay circuit. A suitable assembly, for example, consists of a type Y–705 probe operatively connected to a model 101–F–E "Tektor" electronic level control unit, available from Fielden Instrument Division, Robertshaw-Fulton Controls Company. Such unit may be attached so as to open an electrical circuit at a predetermined high level of material, which circuit remains open until a low level control point is reached. Thereupon, a relay closes the circuit, which remains closed until the high level control point is reached. The aforesaid circuit is connected to the driving mechanism for rolls 7, which rotate at the low base speed when the circuit is open and at higher speed when the circuit is closed. The level control unit 27 may likewise be provided with differently colored signal lights operated by the control circuit, for example to signal green or red, respectively, when the aforesaid circuit is open or closed.

The operating circuit of the above control instrument includes a high frequency, for example 500 kc., vacuum tube oscillator so connected with other circuit elements as to detect readily even an extremely small change in the capacitance of the medium surrounding the probe. Any change greater than a predetermined value is arranged to energize or de-energize a relay which opens or closes the electrical circuit which is being controlled.

With the depth of alkali cellulose in distribution chamber 9 thus being maintained constant, the material is uniformly discharged through the open outlet ports 20 because of the constant motion of scrapers 13. The fibrous particles are moved through airlock 22 by the rotation of vanes 23, dropping into conduit 25. The latter is part of a pneumatic conveying system provided with circulating air at a controlled temperature, which transfers the alkali cellulose particles to a cyclone discharge station from which they drop through conduit 28 to weigh belt assembly 29. The material is then transferred therefrom by means of conveyor 30 to hopper 31 supplying the following treatment station.

The weigh belt assembly 29 may be of conventional design, providing a continuous record of the weight of material being transferred at any instant, as in equipment which is commercially available from Wallace and Tiernan, Inc. Further, the assembly 29 operates an electrical circuit which controls the rate of rotation of shaft 22 and associated vanes 23 of the variable speed rotary airlock 24 to provide a substantially constant rate of feed of alkali cellulose into hopper 31. This feed rate is set in accordance with the requirement of alkali cellulose for conversion in the subsequent treatment, as for the formation of cellulose xanthate by treatment with a metered volume of liquid carbon disulfide in suitable xanthating apparatus, as in a continuous belt xanthator.

The output of alkali cellulose obtained from each outlet 20 of distribution chamber 9 may thus be directed to any of a plurality of xanthators or other subsequent treatment vessel. Likewise, the output of alkali cellulose from an additional aging tower or towers may similarly be distributed to a number of stations for effecting the subsequent treatment. If desired, the output of two aging towers, for example, may be equally divided to each of four xanthators to furnish cellulose xanthate made from a blend of the product of the two towers.

It will be noted that this invention provides for the desired uniform readily controllable distribution of the aged alkali cellulose and also for excellent flexibility in operation. The latter results especially from the facility with which the discharge conduit 28 attached to any given outlet 20 can be arranged to discharge through its associated weigh belt assembly 29 to conveyor 30 feeding material into the hopper 31 of the desired subsequent treatment vessel.

All requirements for successful commercial operation in continuous manner have been accomplished by the distribution process and system in accordance with this invention. In such use, each aging tower has been capable of producing alkali cellulose within the range of about fifteen to two hundred and forty pounds of alkali cellulose per minute, generally at a rate of about one hundred and twenty pounds per minute. The aging period, which is adjustable by varying the height of the alkali cellulose column in the tower to yield an aged product of the desired reactivity and solution viscosity, depends mainly on the content in the alkali cellulose of catalytic manganese and other metallic compounds and on the temperature of the aging process. Thus, an aging period of eight hours is effective at an aging temperature of 41° C., while almost about nine hours is required at a temperature of 39° C.

While specifically described in the above specification and accompanying drawings for purpose of illustration, the invention will be understood by those skilled in the art as capable of various changes and modifications, which are intended to be included within the scope of the following claims.

I claim:

1. In the manufacture of a cellulose derivative, wherein alkali cellulose is aged by the passage of a column thereof through a tower, the continuous distribution process comprising charging alkali cellulose into the top of said column at a rate maintaining a substantially constant weight of aging alkali cellulose in said tower, discharging particles of alkali cellulose from the bottom layer of said column into a distribution chamber, controlling the rate of said discharge to maintain a substantially constant depth of said particles in said chamber, removing said particles from said chamber to a following treatment, and controlling the rate of removal in response to the requirements in weight of alkali cellulose per unit time of the said treatment.

2. In the manufacture of a cellulose derivative wherein alkali cellulose is aged by the passage of a column thereof through a tower, the continuous distribution process comprising charging alkali cellulose into the top of said column at a rate maintaining a substantially constant weight of aging alkali cellulose in said tower, discharging particles of alkali cellulose from the bottom layer of said column into a distribution chamber, controlling the rate of said discharge to maintain a substantially constant depth of said particles in said chamber, removing said particles through any of a plurality of outlets in the base of said chamber to a following treatment, and controlling the rate of removal of alkali cellulose through said outlets in response to the requirements in weight of alkali cellulose per unit time of the said treatment.

3. In the manufacture of viscose, wherein alkali cellulose is aged by the passage of a column thereof through a tower, the continuous distribution process comprising charging alkali cellulose into the top of said column at a rate maintaining a substantially constant weight of aging alkali cellulose in said tower, discharging particles of alkali cellulose from the bottom layer of said column into a distribution chamber, controlling the rate of said discharge to maintain a substantially constant depth of said particles in said chamber, removing said particles through any of a plurality of outlets in the base of said chamber to a following continuous xanthation treatment, and controlling the rate of removal of alkali cellulose through said outlets in response to the requirements in weight of alkali cellulose per unit time of the said xanthation treatment.

4. In apparatus for the aging of alkali cellulose by passage thereof as a column through a tower for subsequent conversion to a cellulose derivative, a continuous distributing device comprising in combination, means for discharging particles of alkali cellulose from the bottom layer of said column to a distribution chamber, means controlling said discharge to maintain a substantially constant depth of said particles in said chamber, a plurality of outlets symmetrically arranged in the base of said chamber, means for conveying the said particles to a following treatment, means in said outlets controlling the passage of said alkali cellulose as required by the said treatment, and weighing means in said conveying means controlling the rate of said passage.

5. Apparatus in accordance with claim 4, wherein said distribution chamber is an annular chamber.

6. Apparatus in accordance with claim 4, wherein the conveying rate control is effected by a variable speed air lock.

7. Apparatus in accordance with claim 4 wherein each of said outlets leads to an individual station for the following treatment.

8. In apparatus for the aging of alkali cellulose by passage thereof as a column through a tower for subsequent conversion to viscose, a continuous distributing device comprising in combination, means for discharging particles of alkali cellulose from the bottom layer of said column to a distributing chamber, means controlling said discharge to maintain a substantially constant depth of said particles in said chamber, a plurality of outlets symmetrically arranged in the base of said chamber, means for conveying the said particles to a xanthation treatment, scraper means for moving said particles over said outlets, means in said outlets controlling the passage of said alkali cellulose as required by the said xanthation treatment and weighing means in said conveying means controlling the rate of said passage.

References Cited in the file of this patent

UNITED STATES PATENTS

| | | |
|---|---|---|
| 920,597 | Mallet | May 4, 1909 |
| 2,490,097 | Seaman et al. | Mar. 15, 1947 |
| 2,601,534 | Laffoon | June 24, 1952 |
| 2,805,924 | Smith | Sept. 10, 1957 |